C. M. SUPPLE.
STOCKING SUPPORTER.
APPLICATION FILED NOV. 12, 1920.
Reissued Jan. 11, 1921. 15,024.
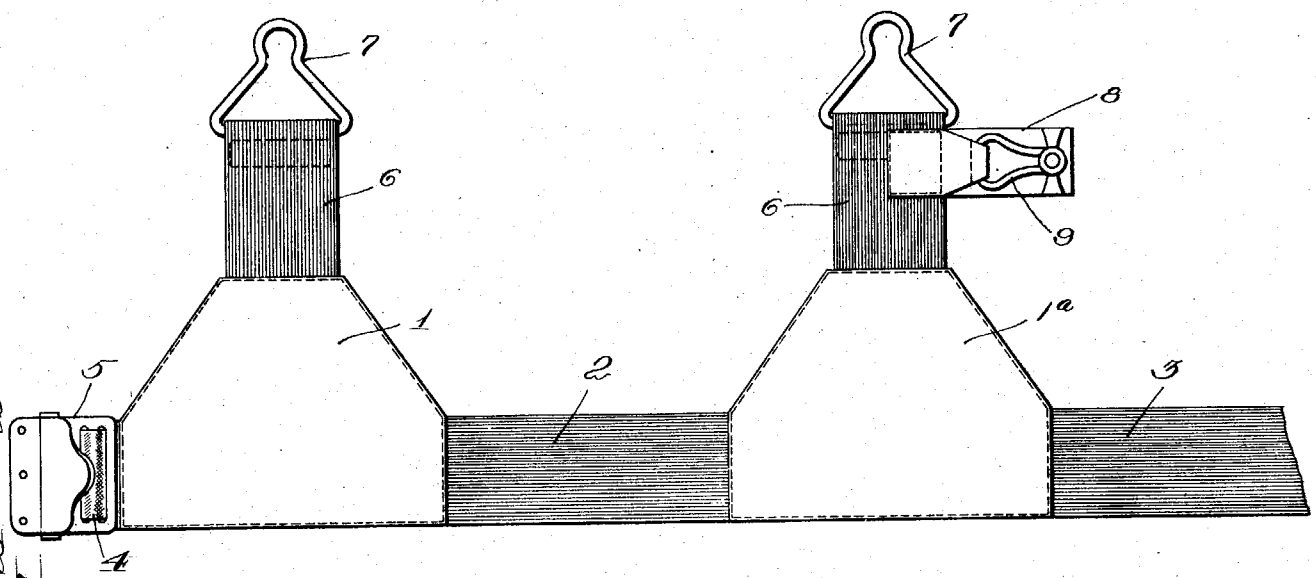
Inventor:
Clare M. Supple
By Wright Brown Quinby & May
Atty's.

UNITED STATES PATENT OFFICE.

CLARE M. SUPPLE, OF BOSTON, MASSACHUSETTS.

STOCKING-SUPPORTER.

15,024. Specification of Reissued Letters Patent. Reissued Jan. 11, 1921.

Original No. 1,353,671, dated September 21, 1920, Serial No. 370,764, filed April 2, 1920. Application for reissue filed November 12, 1920. Serial No. 423,753.

*To all whom it may concern:*

Be it known that I, CLARE MACDONALD SUPPLE, a citizen of the United States, residing at Boston, in the county of Suffolk and State of Massachusetts, have invented new and useful Improvements in Stocking-Supporters, of which the following is a specification.

The object of my present invention is the provision of a stocking-supporter designed to be attached to a corset and constructed in a simple and inexpensive manner with a view to being expeditiously and easily applied in such manner that the stocking is safely and comfortably supported, and yet there is no liability whatever of the stocking being cut or torn at the upper end of the leg portion thereof.

To the attainment of the foregoing, the invention consists in the improvement as hereinafter described and definitely claimed.

In the accompanying drawing, hereby made a part hereof,—

The figure is an elevation of my novel stocking-supporter as the same appears precedent to use.

My novel stocking-supporter is in the nature of an article of manufacture and includes, among other elements, two side sections 1 and 1ª, preferably of thin and soft textile material. Each of the sections 1 and 1ª is provided with an upwardly projecting tapered and truncated upper portion as illustrated. Extending between and permanently joined in appropriate manner to the opposed rear ends of the lower portions of the spaced sections 1 and 1ª is a rear elastic section 2, and permanently joined to and extending from the opposite or front end of the lower portion of the section 1ª is a front elastic section 3, constituting one of the end portions of a garter, other portions of which are formed by the sections 1, 2 and 1ª, said garter being adapted to embrace a stocking below the knee of the wearer. I provide means for detachably connecting the end portions of the garter to contract it upon the stocking, and for taking up and letting out the front section 3 to vary the size of the garter. As here shown, I accomplish this as follows:

Connected in permanent manner to the outer end of the lower portion of the section 1 is a strong tape section 4, and carried by said tape section 4 is a buckle 5, which *per se*, is not of my invention. I would, therefore, have it understood at this point that any appropriate buckle 5 that is compatible with the purpose of my invention may be employed at the point stated on the tape section 4.

The upper ends of the sections 1 and 1ª are adapted to bear on the stocking at opposite sides of the knee of the wearer. In addition to the garter described, the supporter comprises elastic suspending straps 6, permanently joined to and extending upwardly from the upper ends of the sections 1 and 1ª, and links 7 carried by the said elastic straps 6 and designed to be connected through the medium of the usual pendent tabs (not shown) to a corset; it being understood in this connection that the said tabs are carried by and form appurtenances of the corset, and that, therefore, when properly applied, my novel supporter will have the capacity of supporting a stocking, and at the same time holding the corset against upward movement from its proper position. The straps 6 are adapted to bear against the stocking above the knee of the wearer.

I prefer to provide one of the elastic straps 6 with a lateral strap 8, carrying a fastener 9, this, however, is not of the essence of my invention, and it is, therefore, to be understood that the strap 8 may be either employed or altogether omitted without affecting my claimed invention.

In the practical use of my novel stocking-supporter the garter portion thereof is placed about the knee portion of the stocking at a point immediately below the knee, and so that the sections 1 and 1ª rest at opposite sides of the knee, the elastic section 2 rests back of the knee, and the elastic section 3 is connected to the buckle 5 in front of the side of the knee. This latter arrangement manifestly makes it very convenient to apply and adjust and fasten the supporter in its working position.

It will also be noted that the tape section 4 and the elastic section 3 prevent the buckle from contacting with the stocking or the like.

The arrangement described of my novel supporter is advantageous because when the wearer is in a standing position, the muscles in the back of the lower leg at the knee contract, with the result that the circumference of the leg at that point is increased. The elastic section 2 affords ample expansion at the said point to conduce to the comfort of the wearer. Again when the wearer is in a sitting or kneeling position, and the knee is thrown forwardly, the circumference in front of the leg below the knee is enlarged, but this enlargement is comfortably compensated for by the elasticity of the section 3. The sections 1 and 1[a] assume positions at either side of the knee, and both are likely to retain their positions because of the capacity of the sections 2 and 3 to expand and contract, and conform comfortably to the movements of the leg. Moreover, the said sections 1 and 1[a] serve to brace and prevent undue lateral motion of the knee joint, which is particularly true when high heel boots are worn.

Manifestly my novel supporter may be worn loosely, or may be made very tight about the leg below the knee, as desired by the wearer. A stocking leg extending above the knee of the wearer, and fastened as heretofore to the pendent corset tabs, is liable to be torn at the points where it engages said tabs, particularly when the wearer sits, and thus increases the strain on the tabs and stocking leg. My improved supporter obviates the necessity of a direct connection between the corset tabs and the stocking leg, and therefore prevents the above-mentioned liability of tearing the stocking. The garter portion of the supporter sufficiently supports the stocking below the knee, and the stocking portion covering and extending above the knee is prevented from slipping down by the bearing of the side sections 1 and 1[a] on the stocking at opposite sides of the knee, and by the bearing of the suspending straps 6, 6 on the stocking at opposite sides of the leg above the knee.

The lateral strap 8 and its appurtenances are employed to hold the upper part of the stocking as high as possible on the leg and preclude the said upper part falling over the knee.

I claim:

1. A stocking supporter comprising a garter portion, adapted to be worn about the stocking below the knee of the wearer, and including two spaced apart inelastic side sections, a rear elastic section interposed between and permanently connecting the rear ends of the side sections, and a front elastic section permanently joined to the forward end of one side section, and detachably connected with the forward end of the other side section, the side sections having elongated lower portions joined at their opposite ends to the elastic sections, and tapered upper portions projecting above the elastic sections and truncated at their upper ends; elastic straps permanently joined to, and extending upwardly from the truncated upper ends of the side sections; and means at the upper ends of said straps to connect the same to corset appurtenances, means being provided for taking up and letting out the front elastic section to vary the size of the garter portion.

2. As a new and useful article of manufacture, a stocking supporter comprising a garter adapted to be worn about the stocking below the knee of the wearer, and including two spaced textile sections with upwardly tapered and truncated upper portions, an elastic section interposed between and permanently connecting the adjacent ends of the lower portions of the textile sections, an elastic section permanently joined to the outer end of the lower portion of one textile section, and a buckle connected through a tape section with the outer end of the other textile section; elastic straps permanently joined to and extending upwardly from the truncated upper ends of the textile sections, and means at the upper end of the said upwardly extending elastic straps to connect the same to corset appurtenances.

3. As a new and useful article of manufacture, a stocking-supporter comprising a garter adapted to be worn about the stocking below the knee of the wearer, and including spaced textile sections with upwardly tapered and truncated upper portions, an elastic section interposed between and permanently connecting the adjacent ends of the lower portions of the textile sections, an elastic section permanently joined to the outer end of the lower portion of one textile section, and a buckle connected through a tape section with the outer end of the other textile section, elastic straps permanently joined to and extending upwardly from the truncated upper ends of the textile sections, and means at the upper end of the said upwardly extending elastic straps to connect the same to corset appurtenances; one of the said upwardly extending elastic straps being equipped with a lateral strap carrying fastening means to connect the upper portion of a stocking thereto.

CLARE M. SUPPLE.